United States Patent
Salunke et al.

(10) Patent No.: US 10,599,543 B2
(45) Date of Patent: Mar. 24, 2020

(54) UNSUPERVISED METHOD FOR BASELINING AND ANOMALY DETECTION IN TIME-SERIES DATA FOR ENTERPRISE SYSTEMS

(71) Applicant: Oracle International Corporation, Redwood Shores, CA (US)

(72) Inventors: Sampanna Shahaji Salunke, Dublin, CA (US); Dustin Garvey, Oakland, CA (US); Uri Shaft, Fremont, CA (US); Maria Kaval, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 180 days.

(21) Appl. No.: 15/609,938

(22) Filed: May 31, 2017

(65) Prior Publication Data
US 2018/0039555 A1 Feb. 8, 2018

Related U.S. Application Data

(60) Provisional application No. 62/370,880, filed on Aug. 4, 2016.

(51) Int. Cl.
*G06F 11/30* (2006.01)
*G06F 11/32* (2006.01)
(Continued)

(52) U.S. Cl.
CPC .......... *G06F 11/3409* (2013.01); *G06F 11/00* (2013.01); *G06F 11/3034* (2013.01); *G06F 11/3065* (2013.01); *G06F 11/327* (2013.01)

(58) Field of Classification Search
CPC .. G06F 11/3409; G06F 11/00; G06F 11/3034; G06F 11/327; G06F 11/3065
See application file for complete search history.

(56) References Cited

U.S. PATENT DOCUMENTS 6,298,063 B1 10/2001 Coile et al.
6,597,777 B1 7/2003 Ho
(Continued)

FOREIGN PATENT DOCUMENTS

| | | |
|---|---|---|
| CN | 105426411 A | 3/2016 |
| JP | 2006-129446 A | 5/2006 |
| WO | 2011/071624 A2 | 6/2011 |
| WO | 2013/016584 A1 | 1/2013 |

OTHER PUBLICATIONS

Hao et al., Visual Analytics of Anomaly Detection in Large Data Streams, Proc. SPIE 7243, Visualization and Data Analysis 2009, 10 pages.
(Continued)

*Primary Examiner* — Jorge A Casanova
(74) *Attorney, Agent, or Firm* — Invoke

(57) ABSTRACT

Systems and methods for performing unsupervised baselining and anomaly detection using time-series data are described. In one or more embodiments, a baselining and anomaly detection system receives a set of time-series data. Based on the set of time-series, the system generates a first interval that represents a first distribution of sample values associated with the first seasonal pattern and a second interval that represents a second distribution of sample values associated with the second seasonal pattern. The system then monitors a time-series signals using the first interval during a first time period and the second interval during a second time period. In response to detecting an anomaly in the first seasonal pattern or the second seasonal pattern, the system generates an alert.

20 Claims, 13 Drawing Sheets

(51) Int. Cl.
  *G06F 11/34* (2006.01)
  *G06F 11/00* (2006.01)

(56) References Cited

U.S. PATENT DOCUMENTS

| | | |
|---|---|---|
| 6,643,613 B2 | 11/2003 | McGee et al. |
| 6,996,599 B1 | 2/2006 | Anders et al. |
| 7,343,375 B1 | 3/2008 | Dulac |
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,910 B2 | 5/2017 | Poola et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0087962 A1 | 4/2006 | Golia et al. |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0030752 A1 | 1/2009 | Senturk-Doganaksoy et al. |
| 2010/0027552 A1 | 2/2010 | Hill |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0278663 A1 | 11/2012 | Hasegawa |
| 2012/0323988 A1 | 12/2012 | Barzel et al. |
| 2013/0326202 A1 | 12/2013 | Rosenthal et al. |
| 2013/0329981 A1 | 12/2013 | Hiroike |
| 2014/0067757 A1 | 3/2014 | Ailon et al. |
| 2014/0095422 A1 | 4/2014 | Solomon et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0180734 A1 | 6/2015 | Maes et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0312274 A1 | 10/2015 | Bishop et al. |
| 2016/0034328 A1 | 2/2016 | Poola et al. |
| 2016/0042289 A1 | 2/2016 | Poola et al. |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0171037 A1 | 6/2016 | Mathur et al. |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |
| 2016/0299961 A1 | 10/2016 | Olsen |
| 2016/0321588 A1 | 11/2016 | Das et al. |
| 2016/0342909 A1 | 11/2016 | Chu et al. |
| 2016/0357674 A1 | 12/2016 | Waldspurger et al. |
| 2016/0378809 A1 | 12/2016 | Chen et al. |
| 2017/0249564 A1 | 8/2017 | Garvey et al. |
| 2017/0249648 A1 | 8/2017 | Garvey et al. |
| 2017/0249649 A1 | 8/2017 | Garvey et al. |
| 2017/0249763 A1 | 8/2017 | Garvey et al. |
| 2017/0262223 A1 | 9/2017 | Dalmatov et al. |
| 2017/0329660 A1 | 11/2017 | Salunke et al. |
| 2017/0351563 A1 | 12/2017 | Miki et al. |
| 2017/0364851 A1 | 12/2017 | Maheshwari et al. |
| 2018/0026907 A1 | 1/2018 | Miller et al. |
| 2018/0052804 A1 | 2/2018 | Mikami et al. |
| 2018/0053207 A1 | 2/2018 | Modani et al. |
| 2018/0321989 A1 | 11/2018 | Shetty et al. |
| 2018/0330433 A1 | 11/2018 | Frenzel et al. |
| 2019/0065275 A1 | 2/2019 | Wong et al. |

OTHER PUBLICATIONS

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

(56) References Cited

OTHER PUBLICATIONS

Ahmed, Reservoir-based network traffic stream summarization for anomaly detection, Article in Pattern Analysis and Applications, Oct. 2017.
Greunen, "Forecasting Methods for Cloud Hosted Resources, a comparison," 2015, 11th International Conference on Network and Service Management (CNSM), pp. 29-35 (Year: 2015).
Yokoyama, Tetsuya, "Windows Server 2008, Certification Test, Part 5: Reliability", Apr. 15, 2008, pp. 124-125 along with 4 pages of English Translation.
Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015] .
Voras I et al: "Evaluating open-source cloud computing solutions", MIPRO, 2011 Proceedings of the 34th International Convention, IEEE, May 23, 2011 (May 23, 2011), pp. 209-214.
Voras et al., "Criteria for Evaluation of Open Source Cloud Computing Solutions", Proceedings of the ITI 2011 33rd international Conference on Information Technology Interfaces (ITI), US, IEEE, Jun. 27-30, 2011, 6 pages.
Taylor J W et al: "Forecasting intraday time series with multiple seasonal cycles using parsimonious seasonal exponential smoothing", OMEGA, vol. 40, No. 6, Dec. 2012 (Dec. 2012), pp. 748-757.
Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.
Somlo, Gabriel, et al., "Incremental Clustering for Profile Maintenance in Information Gathering Web Agents", AGENTS '01, Montreal, Quebec, Canada, May 28-Jun. 1, 2001, pp. 262-269.
Slipetskyy, Rostyslav, "Security Issues in OpenStack", Master's Thesis, Technical University of Denmark, Jun. 2011, 90 pages.
Nurmi D et al: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.
NPL: Web document dated Feb. 3, 2011, Title: OpenStack Compute, Admin Manual.
Niino,Junichi, "Open Source Cloud infrastructure 'OpenStack', its History and Scheme", available online at <http://www.publickey1.jp/blog/11/openstack_1.html>, Jun. 13, 2011, 8 pages.
Jarvis, R. A., et al., "Clustering Using a Similarity Measure Based on Shared Neighbors", IEEE Transactions on Computers, vol. C-22, No. 11, Nov. 1973, pp. 1025-1034.
Haugen et al., "Extracting Common Time Trends from Concurrent Time Series: Maximum Autocorrelation Factors with Applications", Stanford University, Oct. 20, 2015, pp. 1-38.
Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.
Davies, David L., et al., "A Cluster Separation measure", IEEE Transactions on Pattern Analysis and Machine Intelligence, vol. PAMI-1, No. 2, Apr. 1979, pp. 224-227.
Chris Bunch et al: "AppScale: Open-Source Platform-as-a-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.
Charapko, Gorilla—Facebook's Cache for Time Series Data, http://charap.co/gorilla-facebooks-cache-for-monitoring-data/, Jan. 11, 2017.
Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.
Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].
Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.
"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].
"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Apr. 12, 2015].
Wilks, Samuel S. "Determination of sample sizes for setting tolerance limits." The Annals of Mathematical Statistics 12.1 (1941): 91-96.
Lin, Xuemin, et al. "Continuously maintaining quantile summaries of the most recent n elements over a data stream." IEEE, 2004.
Greenwald et al. "Space-efficient online computation of quantile summaries." ACM Proceedings of the 2001 SIGMOD international conference on Management of data pp. 58-66.
Dunning et al., Computing Extremely Accurate Quantiles Using t-Digests.
Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.
Faraz Rasheed, "A Framework for Periodic Outlier Pattern Detection in Time-Series Sequences," May 2014, IEEE.

UNSUPERVISED METHOD FOR BASELINING AND ANOMALY DETECTION IN TIME-SERIES DATA FOR ENTERPRISE SYSTEMS

BENEFIT CLAIM RELATED APPLICATIONS

This application claims the benefit of U.S. Provisional Patent Appl. No. 62/370,880, filed Aug. 4, 2016, the entire contents of which are incorporated by reference as if set forth in their entirety.

This application is related to U.S. application Ser. No. 15/266,971, entitled "SEASONAL AWARE METHOD FOR FORECASTING AND CAPACITY PLANNING"; U.S. application Ser. No. 15/445,763, entitled "METHOD FOR CREATING PERIOD PROFILE FOR TIME-SERIES DATA WITH RECURRENT PATTERNS"; U.S. application Ser. No. 15/266,979, entitled "SYSTEMS AND METHODS FOR DETECTING AND ACCOMODATING STATE CHANGES IN MODELLING"; U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; U.S. application Ser. No. 15/140,358, entitled " SCALABLE TRI-POINT ARBITRATION AND CLUSTERING"; and U.S. application Ser. No. 15/155,486, entitled "CORRELATION-BASED ANALYTIC FOR TIME-SERIES DATA", the entire contents for each of which are incorporated by reference herein as if set forth in their entirety.

TECHNICAL FIELD

The present disclosure relates to techniques for generating baselines and monitoring time-series data for anomalies.

BACKGROUND

Anomaly detection involves systems and processes for identifying behavior that does not conform to expectations. On enterprise and cloud computing platforms, for instance, anomaly detection may provide warnings if unusual behavior is exhibited by metric data collected from system hardware and software resources. If left unaddressed, anomalous behavior may compromise system security and performance. Anomaly detection systems attempt to mitigate such performance degradation by detecting and treating anomalies as efficiently as possible.

Anomaly detection is complicated by the significant variance in behavior from one system to the next. For example, a typical pattern of resource usage in one datacenter environment may have different patterns of highs and lows than in another datacenter environment. As a result, behavior that is anomalous in one computing environment may not be anomalous in another environment.

Threshold-based alerting is an example approach to anomaly detection. According to this approach, a user defines the acceptable range of values, and an alarm is triggered if a monitored value falls outside the user-defined range. The user may define the thresholds based on specific domain knowledge of the system to supervise the anomaly detection process such that the thresholds are tailored for specific behavior exhibited by the system. This approach allows the user to inject domain knowledge into the system to supervise the anomaly detection process. However, selecting the appropriate thresholds on which to trigger alerts may be complicated based on the large number of anomalous events that may occur in large-scale systems. Adding to the complexity, system resources may exhibit trends, seasonal fluctuations, and other time-varying behaviors that evolve over time. A user may be unaware of and/or unable to keep up with normal behavioral patterns. As a result, users may be prone to selecting sub-optimal thresholds, which may result in false positive alerts that flag system normal system behavior and/or neglect other system behavior that is anomalous.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
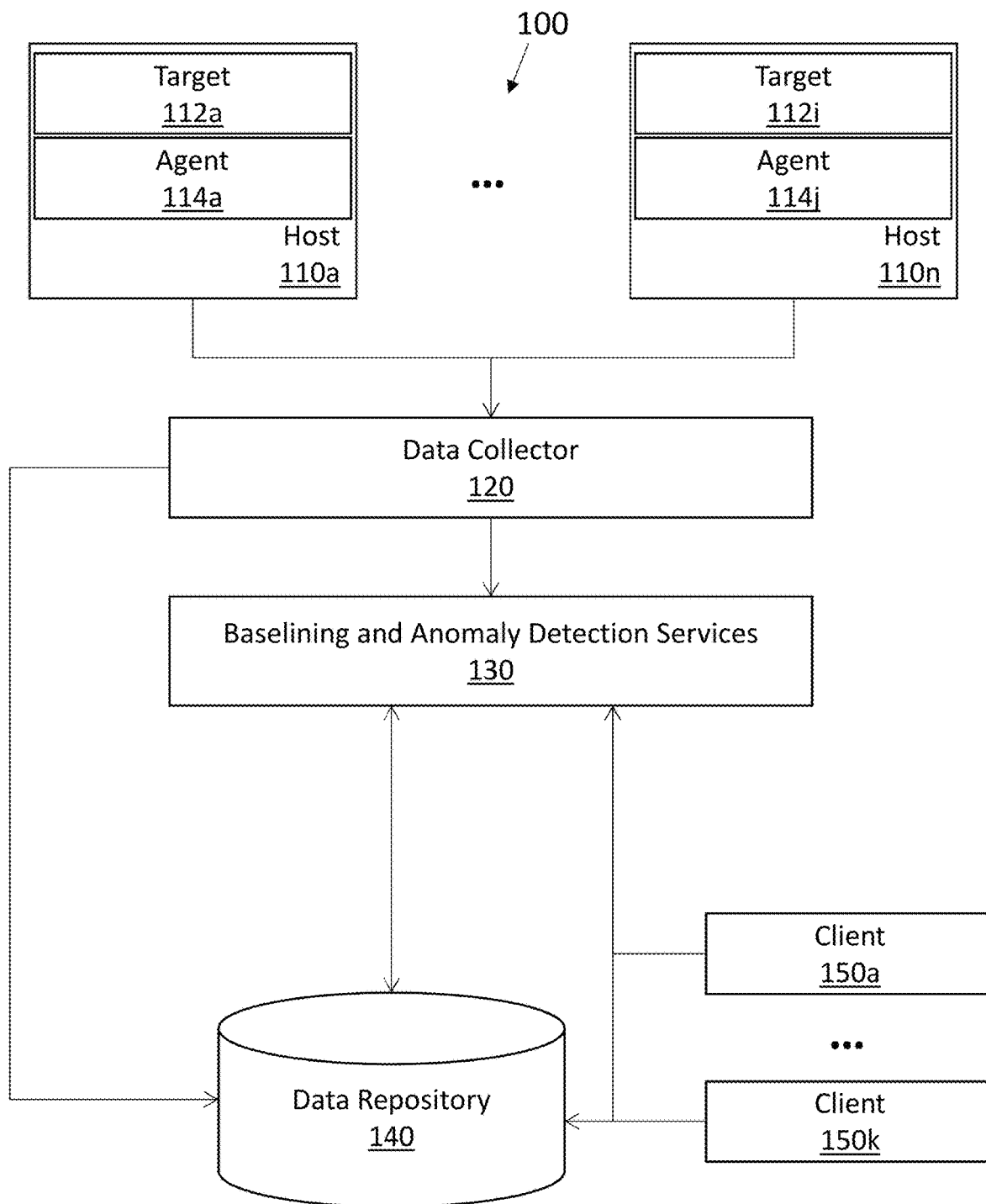
FIG. 1 illustrates a system for performing baselining and anomaly detection in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL AND FUNCTIONAL OVERVIEW
3. UNSUPERVISED BASELINE MODELLING OF RESOURCE BEHAVIOR
4. UNSUPERVISED MONITORING AND ANOMALY DETECTION
5. BASELINE UPDATES AND TRANSITIONS
6. COMPUTER NETWORKS AND CLOUD NETWORKS
7. MICROSERVICE APPLICATIONS
8. HARDWARE OVERVIEW
9. MISCELLANEOUS; EXTENSIONS

1. General Overview

In enterprise systems, cloud computing platforms, and other large-scale computing environments, metric data associated with hardware and/or software resources may follow seasonal patterns. For example, a typical pattern of resource usage may involve a low load on weekends and an increasing load during the weekdays that peaks around Wednesdays and Thursdays. Such seasonal behavior varies from system to system—some systems are highly predictable while other systems may be less predictable or not predictable at all.

Baselining is a process through which historical and expected resource behavior may be modelled and analyzed. Baselining metric data presents challenges within large-scale computing environments. Measurement systems that collect metric data are generally software processes that can be and are often restarted, causing a "drift" in measurement. For example, central processing unit (CPU) utilization for a host device may be sampled at 1 pm, 1:05 pm, 1:10 pm etc. on day 1, and 1:01 pm, 1:06 pm, 1:11 pm etc. on day 2. As a result, the measurement systems may not be able to perform direct baseline comparisons of metric data sampled at the same time on different days. Adding to the complexity, the load on enterprise systems may vary dramatically at different times of the day or week, and unlike physical assets, the times of the day or week may be defined by the time zone of the users of the enterprise system, not the time zone of system itself.

Systems and methods are described herein for performing unsupervised baselining and anomaly detection in cloud and other computing platforms. In one or more embodiments, a baselining and anomaly detection system comprises a set of one or more machine-learning processes that automatically identify the predictability of observed resource behavior. For example, the system may receive time-series data that track metrics associated with hardware and/or software resources in a target environment for examination. The system may analyze the received metric data to learn patterns that repeat daily, weekly, bi-weekly, monthly, on holidays and/or over some other seasonal period. Within detected seasonal patterns, the system may generate baseline models to represent expected system behavior. The system may leverage the learned behavior to generate baselines that are tailored to the specific environment under examination.

In one or more embodiments, baseline models incorporate uncertainty intervals for detected seasonal patterns. An uncertainty interval is a distribution of sample values that conform with a seasonal pattern. A range of values is used rather than an exact value to account for variance and/or uncertainty in the seasonal pattern. As described further herein, an anomaly may be detected based on whether a time-series signal crosses an uncertainty interval limit.

Different uncertainty intervals may be associated with different seasonal patterns. For instance, within a detected weekly season, a baseline modelling a pattern of high sub-periods and a pattern of low sub-periods may be generated. In some cases, the high sub-periods may be more unpredictable than the low periods. To accommodate the difference, the baseline model may associate the high sub-periods with a larger uncertainty interval (i.e., a greater range of values) than the lower sub-periods. In other cases, the seasonal lows may have a larger uncertainty interval than the seasonal highs.

In one or more embodiments, the baselining and anomaly detection system uses the baseline models to monitor metric data for anomalies. For example, the system may monitor a time-series signal carrying a sequence of metric values for data points that fall outside of an uncertainty interval defined by a baseline model. An alert may be triggered if at least one value falls outside the uncertainty interval to provide warning of anomalous behavior.

In sensitive systems, a single value outside of the uncertainty interval may trigger an alert. In other embodiments, small deviations may be permitted without triggering an alert. To prevent the system from flagging every data point that is outside of the range of values defined by the baseline, smoothed expectation windows and/or cumulative summing techniques may be applied during evaluation, as described further herein. The techniques may reduce false positives caused by measurement drift and reduce the volume of alerts to a more manageable level.

Techniques are further described herein for updating baseline models over time. As more data points are received, the system may adapt the baseline model to newly learned seasonal behavior. For example, a baseline model may initially be trained to represent daily seasonality. As more data points are received, weekly patterns may be detected and modelled. To incorporate the newly learned seasonal patterns, the system may transition the baseline model may from a daily seasonal model to a weekly seasonal model. Thus, a baseline model may evolve and become more accurate over time.

2. Architectural Overview

In one or more embodiments, an unsupervised baselining and anomaly detection system is configured to operate on time series signals. A time series signal comprises a sequence of values that are captured over time. The source of the time series data and the type of information that is captured may vary from implementation to implementation. For example, a time series may be collected from one or more software and/or hardware resources and capture various performance metrics of the resources from which the data was collected. As another example, a time series may be collected using one or more sensors that measure physical properties, such as temperature, pressure, motion, traffic flow, or other attributes of an object or environment.

FIG. 1 illustrates an example system for automatic baselining and anomaly detection based on time-series data captured by one or more host devices. System 100 generally comprises hosts 110a-n, data collector 120, baselining and anomaly detection services 130, data repository 140, and clients 150a-k. Components of system 100 may be implemented in one or more host machines operating within one or more clouds or other networked environments, depending on the particular implementation.

Hosts 110a-n represent a set of one or more network hosts and generally comprise targets 112a-i and agents 114a-j. A "target" in this context refers to a resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

Agents 114a-j comprise hardware and/or software logic for capturing time-series measurements from a corresponding target (or set of targets) and sending these metrics to data collector 120. In one or more embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, etc., that capture time-series measurements of a physical environment and/or resource. Although only one agent and target is illustrated per host in FIG. 1, the number of agents and/or targets per host may vary from implementation to implementation. Multiple agents may be installed on a given host to monitor different target sources of time series data. In other embodiments, an agent that resides remotely on a different host than a target may be responsible for collecting sample time-series data from the target.

Data collector 120 includes logic for aggregating data captured by agents 114a-j into a set of one or more time-series. Data collector 120 may store the time series data in data repository 140 and/or provide the time-series data to baselining and anomaly detection services 130. In one or more embodiments, data collector 120 receives data from agents 114a-j over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

Baselining and anomaly detection services 130 includes logic for training models that represent the behavior of a set of time-series data and evaluating the models to detect anomalous behavior. Baselining and anomaly detection services 130 may implement techniques described in further detail below to perform unsupervised baselining and anomaly detection on one or more time series signals originating from targets 112a-i. Baselining and anomaly detection services 130 may comprise logic for generating baseline models, monitoring time series signals for anomalies, and triggering responsive actions when anomalies are detected.

Data repository 140 includes volatile and/or non-volatile storage for storing data that is generated and/or used by baselining and anomaly detection services 130. Example data that may be stored may include, without limitation, time-series data collected, seasonal pattern classifications, baseline data for one or more classified seasonal patterns, and anomaly report data. Data repository 140 may reside on a different host machine, such as a storage server that is physically separate from baselining and anomaly detection services 130, or may be allocated from volatile or non-volatile storage on the same host machine.

Clients 150a-k represent one or more clients that may access baselining and anomaly detection services 130 to generate baselining operations and/or perform anomaly detection. A "client" in this context may be a human user, such as an administrator, a client program, or some other application instance. A client may execute locally on the same host as analytic services 130 or may execute on a different machine. If executing on a different machine, the client may communicate with baselining and anomaly detection services 130 via one or more data communication protocols according to a client-server model, such as by submitting HTTP requests invoking one or more of the services and receiving HTTP responses comprising results generated by one or more of the services. Baselining and anomaly detection services 130 may provide clients 150a-k with an interface through which one or more of the provided services may be invoked. Example interfaces may comprise, without limitation, a graphical user interface (GUI), an application programming interface (API), a command-line interface (CLI) or some other interface that allows a user to interact with and invoke one or more of the provided services.

In one or more embodiments, baselining and anomaly detection services 130 models system behavior from an input set of historical time-series data. Training the model may be performed without user input through unsupervised machine learning techniques. The unsupervised techniques may include automatically detecting seasonal patterns, approximating the behavior of each seasonal pattern, and determining a normal or other representative distribution for each seasonal pattern.

Once trained, the model may be used to evaluate whether a behavior exhibited by a system is anomalous or not. For example, the model may be evaluated against an input time-series signal that tracks a metric associated with a hardware or software resource. If the time-series signal deviates from an expected behavior by a statistically significant amount, then the model may raise a flag or other alert to notify a user about the anomalous behavior.

Figure 2:
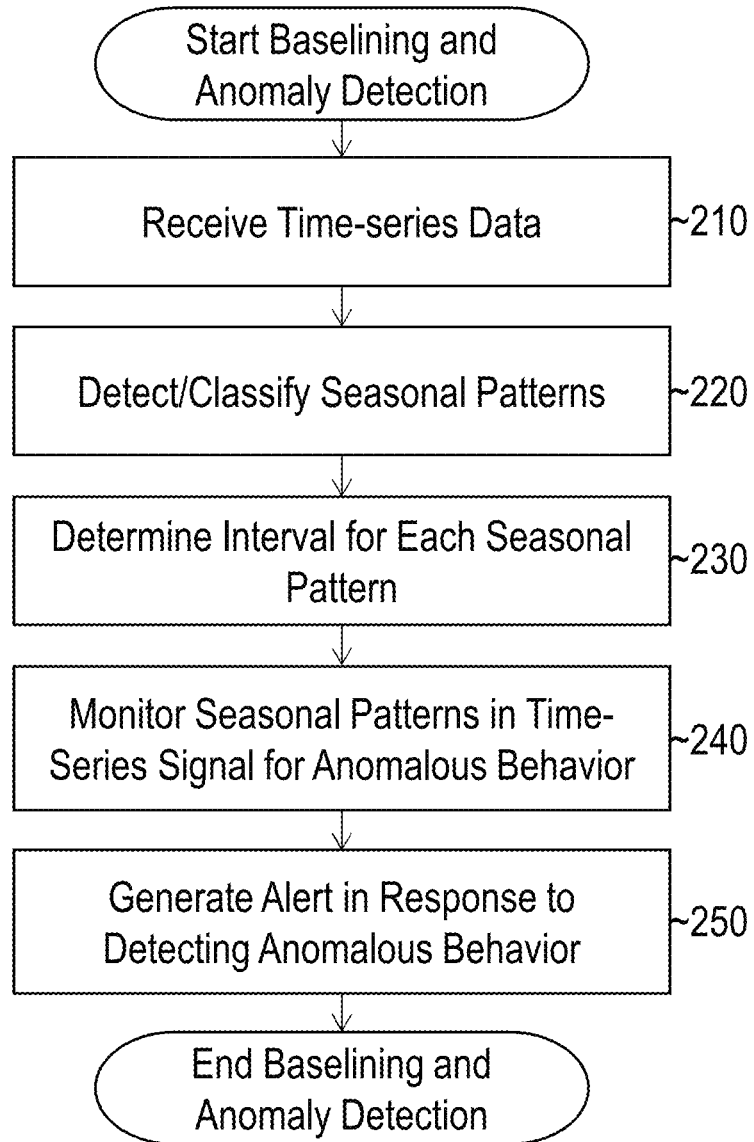
FIG. 2 illustrates an example set of operations for monitoring a time-series signal for anomalies in accordance with one or more embodiments.

Referring to FIG. 2, an example set of operations for monitoring a time-series signal for anomalies is illustrated in accordance with one or more embodiments. At 210, the process receives a set of time-series data that includes a sequence of values captured by one or more computing devices over time. As an example, the time-series signal may track CPU usage, active database sessions, memory bandwidth, I/O operations, or any other metric that measures or otherwise indicates a performance of a target software or hardware resource. The set of time-series data may be collected from targets 112a-i, as previously described, and provided to baselining and provided to baselining and anomaly detection services 130 for further analysis.

At 220, the process detects two or more seasonal patterns within the set of time-series data, including a first seasonal pattern and a second seasonal pattern. Example seasonal patterns that may be detected may include, without limitation, seasonal highs, seasonal lows, sparse highs, sparse lows, dense highs, and dense lows. Techniques for detecting and classifying seasonal patterns are described in U.S. application Ser. No. 15/057,065, entitled "SYSTEM FOR DETECTING AND CHARACTERIZING SEASONS"; U.S. application Ser. No. 15/057,060, entitled "SUPER- VISED METHOD FOR CLASSIFYING SEASONAL PATTERNS"; and U.S. application Ser. No. 15/057,062, entitled "UNSUPERVISED METHOD FOR CLASSIFYING SEASONAL PATTERNS", which were previously incorporated by reference.

At 230, the process determines, based at least in part on the set of time-series data, an interval for each detected seasonal pattern. In the case where two seasonal patterns are detected, a first interval may be determined for a first seasonal pattern that represents a first distribution of sample values associated with the first seasonal pattern, and a second interval may be determined for a second seasonal pattern that represents a second distribution of sample values associated with the second seasonal pattern. If there are more seasonal patterns, additional intervals may be determined independently for each remaining seasonal pattern. There are many different ways in which an interval may be computed. In one or more embodiments, the first and second intervals are uncertainty intervals, such as a tolerance interval, within a prescribed level of confidence. In other cases, an interval may correspond to a normal (e.g., Gaussian) or regular distribution of sample values that conform to a seasonal pattern.

At 240, the process monitors a time-series signal for anomalies in the detected seasonal patterns. For example, if in a high season, the process may monitor data points to determine whether the behavior conforms to expected behavior. More specifically, the process may compare the data points to a corresponding interval that represents an expected distribution of values the high season. If one or more data points fall outside the range of values defined by the interval, then an anomaly may be detected. During a low seasonal period, the process may compare the data points to a different interval that represents an expected distribution for low seasons. The range of values may be larger or smaller than the interval for the high season, depending on the variation and amount of uncertainty in the seasonal patterns. Thus, different interval ranges may be used depending on whether the data point being evaluated is in a high season or a low season.

In one or more embodiments, behavior may not immediately be classified as anomalous if the data point under evaluation falls outside of the expected interval. The process may analyze the deviation to determine whether it is statistically significant. If the deviation is statistically significant, then the behavior may be classified as anomalous. The process may analyze a variety of factors to determine whether deviant behavior is statistically significant. For example, the determination may be based on the magnitude of the deviation, the trend of the deviation, and the length of time of the deviation. Examples classification techniques are described further below.

At 250, the process generates an alert in response to detecting an anomaly in the first seasonal pattern or the second seasonal pattern. The alert may cause display of information regarding the detected anomaly. For instance, the alert may identify the metric that is being tracked that is exhibiting anomalous behavior, the time the anomalous behavior was detected, the expected seasonal behavior of the metric, such as whether it was expected to be sparse high, dense high, low, etc., the uncertainty interval of the normal distribution of the behavior, and the observed behavior that triggered the alert. In one or more embodiments, the interval representing the normal distribution may be plotted and overlaid against the observed anomalous behavior.

Additionally or alternatively, one or more other responsive actions may be performed in response to detecting an anomaly. Example responsive actions may include, but are not limited to deploying additional resources to satisfy unexpected increases in resource demand (e.g., to service additional client requests), bringing resources offline due to unexpected decreases in demand or to prevent potential compromising behavior (e.g., to prevent denial of service attacks), and updating resource configurations (e.g., shifting requests from a resource experiencing unexpected overload to a more available resource).

3. Unsupervised Baseline Modelling of Resource Behavior

In one or more embodiments, baselining and anomaly detection services 130 includes logic for generating baseline models based on historic time-series data. A baseline model, in this context, is a data object or data structure that is generated, in data repository 140, as a representation of historical and/or expected patterns. For example, a baseline model may define a range of values that recur on a periodic or seasonal basis. In the context of CPU utilization, for instance, a model may define a pattern of CPU utilization rates that historically occur on a seasonal basis (e.g., hourly, daily, weekly, monthly, etc.). Baseline models may approximate other resource behavior including, without limitation, user logons to access a resource, transactions metrics (e.g., the number of frequency of transactions occurring on a database or other transactional system), execution metrics (e.g., the number of executions per second on a host), resource calls (e.g., the number and frequency of requests to access a particular resource), CPU performance metrics (e.g., CPU utilization rates, thread counts, etc.), memory bandwidth metrics (e.g., memory usage rates, cache hit rates, etc.), I/O metrics (e.g., physical reads and writes to disk), and network metrics (e.g., packet counts, packet flow rates, etc.).

Figure 3:
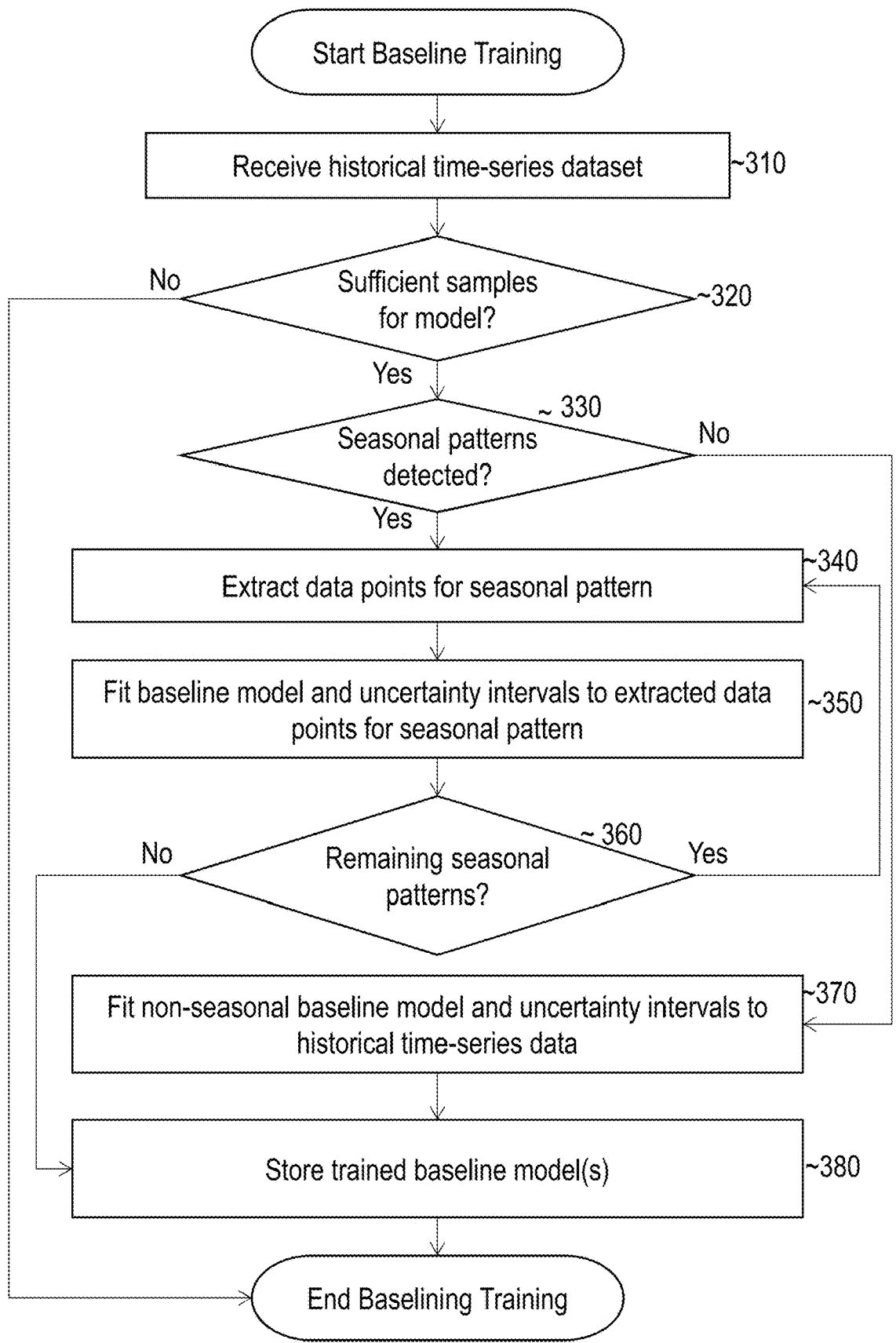
FIG. 3 illustrates an example set of operations for generating baseline models in accordance with one or more embodiments.

FIG. 3 illustrates an example set of operations for generating baseline models in accordance with one or more embodiments. The set of operations include receiving a historical time-series dataset (Operation 310). For example, data repository 140 and/or baseline and anomaly detection services 130 may receive resource metrics from one or more targets via data collector 120. Data collector 120 may provide the metrics on-demand, periodically, or on a streaming/continuous basis, depending on the particular implementation.

Responsive to receiving the set of historical services, the process determines whether there are sufficient samples for a model (Operation 320). The determination may be made based on a comparison of the number of sample values in the historical time-series dataset to a threshold value, which may vary from implementation to implementation. In the context of hourly samples for instance, a threshold value of thirty may be set to ensure that at least thirty hours of data have been collected before training begins. However, the sample period and the threshold value may be tailored to account for other preferences and system behavior. If there are insufficient sample, then the process exits without training a model. Otherwise, the process continues according to the operations set forth below.

If there are a sufficient number of samples to generate a model, then the process analyzes the historical time-series dataset to detect whether any seasonal patterns exist (Operation 330). The analysis may depend on the amount of data points included in the historical time-series dataset. For example, if there are more than two weeks of sample values, then the process may first determine whether the resource metrics exhibit any weekly patterns. For instance, a weekly seasonal high resource usage may be detected on Wednesdays and Thursdays from 9-5 based on the historical patterns while weekly lows may occur in the late evenings and/or on weekends. If there are no weekly seasons or not enough data has been collected to detect weekly seasons, then the process may analyze the data for daily seasonal patterns. For instance, daily highs may be detected from 9 a.m. to noon while lows may be detected from 10 pm. to 2 a.m. (or any other timeframe, depending on the dataset). Techniques for detecting and classifying seasonal patterns are described further in U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and U.S. application Ser. No. 15/057,062, entitled "UNSUPERVISED METHOD FOR CLASSIFYING SEASONAL PATTERNS", which were previously incorporated by reference.

In one or more embodiments, determining whether seasonal patterns are present is based on the correlation between different instances of a season. For example, to detect daily seasons, data may be aggregated by hourly granularity using the maximum observed value in the hour. The data may then be split into a list of time-series elements, with each element corresponding to one day and storing the maximum value for each hour of the corresponding day. The process may calculate correlations between each daily time series and calculate the lower triangular matrix of correlations. If at least a threshold (e.g., 50%) of the correlations are greater than threshold value (e.g., 0.3), then a daily pattern is detected. Otherwise, the process may determine that the correlation between different hours of the same day are not correlated closely enough to be indicative of a daily pattern. This process may be applied to other seasonal timeframes (e.g., monthly, weekly etc.) to detect whether or not a seasonal pattern is present.

Responsive to detecting a seasonal pattern, the process extracts data points that are associated with the seasonal pattern (Operation 340). In one or more embodiments, sample values are collected from multiple instances of the high season. For example, if a weekly high is detected on Tuesday from 10 a.m. to 3 p.m., then sample values across multiple weeks from the corresponding seasonal period may be collected and grouped in memory for further analysis. The data points that are extracted may vary depending on how the seasonal patterns are classified.

The process continues by fitting a baseline model and computing uncertainty intervals using the extracted data points for the seasonal pattern (Operation 350). In one or more embodiments, an additive or multiplicative Holt-Winters model may be fit to the data points. The Additive Holt-Winters model is given by the following formulas:

$$L_t = \alpha(X_t - S_{t-p}) + (1-\alpha)(L_{t-1} + T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. An expected value at future time t+k may be given as follows:

$$F_{t+k} = L_t + k\,T_t + S_{t+k-p} \quad (4)$$

The Multiplicative Holt-Winters models is given by the following formulas:

$$L_t = \alpha(X_t/S_{t-p}) + (1-\alpha)(L_{t-1} + T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index of the correlation time series at time t, respectively. An expected value at time t+k is then given by the following formula:

$$F_{t+k} = (L_t + k\,T_t)S_{t+k-p} \quad (8)$$

In other embodiments, the process may attempt to fit the extracted time-series data points to other seasonal models, such as seasonal autoregressive integrated moving average (ARIMA) models.

In one or more embodiments, the uncertainty interval that determined at Operation 350 is a tolerance interval. A tolerance interval is used to indicate a range where an individual forecasted value is expected to fall. In other words a tolerance interval may be mathematically defined to be the range of values that will contain a threshold percentage of future samples. The tolerance interval may be determined based on a set of residuals, where a residual is a difference between an expected value and an observed value. The tolerance interval may be calculated by fitting a normal distribution of the set of residuals to the sample within a prescribed confidence (e.g., 95% or any other threshold may be used). The tolerance interval $\bar{x} \pm \lambda s$ may be computed as follows:

$$\frac{1}{\sqrt{2\pi\sigma^2}} \int_{\bar{x}-\lambda s}^{\bar{x}+\lambda s} e^{-(t-\mu)^2/2\sigma^2} dt \geq \gamma; \quad (9)$$

where $\bar{x}$ is the sample mean, $s^2$ is the sample variance, $\sigma$ is the standard deviation, t is the sample time, and $\gamma$ is the prescribed confidence. Techniques for computing tolerance intervals are further described in U.S. application Ser. No. 15/266,971, entitled "SEASONAL AWARE METHOD FOR FORECASTING AND CAPACITY PLANNING", previously incorporated by reference. In other embodiments, other intervals, such as confidence intervals and/or projection intervals, may be used to model the uncertainty interval.

Once the baseline model for the seasonal pattern has been generated, the process determines whether there are any remaining seasonal patterns for which baseline models have not yet been generated (Operation 360). If any seasonal patterns remain, then the process returns to operation 340 to train a baseline model and uncertainty intervals using data points associated with the next seasonal pattern. For example, the process may separate data points associated with the high seasonal periods and low seasonal periods. The process may generate a baseline and associated intervals independently for each respective seasonal period using the corresponding data points.

If no seasonal patterns are detected in the historical time-series data, then the process fits a non-seasonal baseline model and uncertainty interval (Operation 370). Example non-seasonal models that may be fit include, but are not limited to maximum concentration interval (MCI) models and non-seasonal ARIMA models. The uncertainty intervals may be computed as previously described, although the intervals are not associated with seasonal patterns in this case.

Once trained, the baseline models are stored in data repository 140 (Operation 380). The trained baseline models are used to monitor and evaluate incoming time-series data for anomalies.

Figure 4:
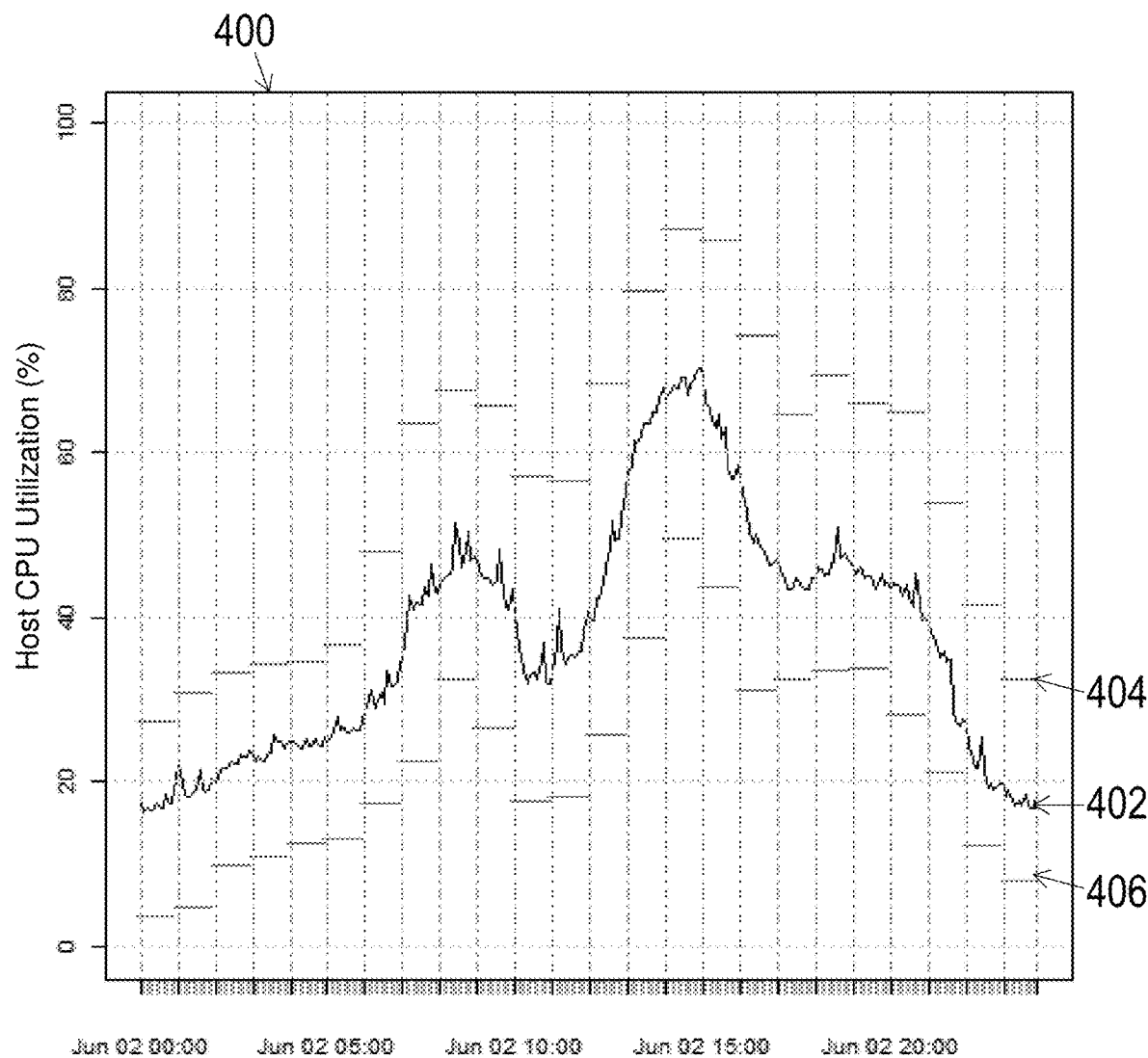
FIG. 4 illustrates an example baseline model generated from historical resource metric data in accordance with one or more embodiments.

FIG. 4 illustrates an example baseline model generated from historical resource metric data in accordance with one or more embodiments. Chart 400 includes baseline model 402, which represents a daily baseline for a host CPU utilization rate on a target resource. An uncertainty interval is defined by upper limit 404 and lower limit 406. The baseline and interval may be calculated from historical CPU utilization metrics according to the process previously described.

Upper limit 404 and lower limit 406 may be determined independently for different seasonal patterns. For example, the daily high at 15:00 may have a wider range than the daily low at 0:00. Computing uncertainty independently for different seasonal patterns allows for a more robust baselining and anomaly detection system. Different uncertainties may be detected for different respective seasonal patterns due to the variation and distribution of values that are associated with each seasonal pattern. If the uncertainty is more predictable for one seasonal period than another seasonal period, then the different intervals may capture this characteristic when training the baseline model. As a result, the interval for high seasonal patterns may be much greater than the interval for low seasonal patterns. If a data point is associated with the high seasonal pattern, may be allowed a much wider range than a data point associated with a low seasonal pattern before an alert is triggered.

4. Unsupervised Monitoring and Anomaly Detection

In one or more embodiments, baselining and anomaly detection services 130 includes logic for monitoring time-series data for anomalies. During monitoring, incoming time-series data may be compared against a trained baseline model to determine whether one or more data points conform to expectations. For example, CPU utilization rates for a target host may be compared to the baseline depicted in FIG. 4. If the time-series dataset under examination does not conform, then one or more responsive actions may be taken to mitigate performance degradation and/or other problems caused by the behavior.

Figure 5:
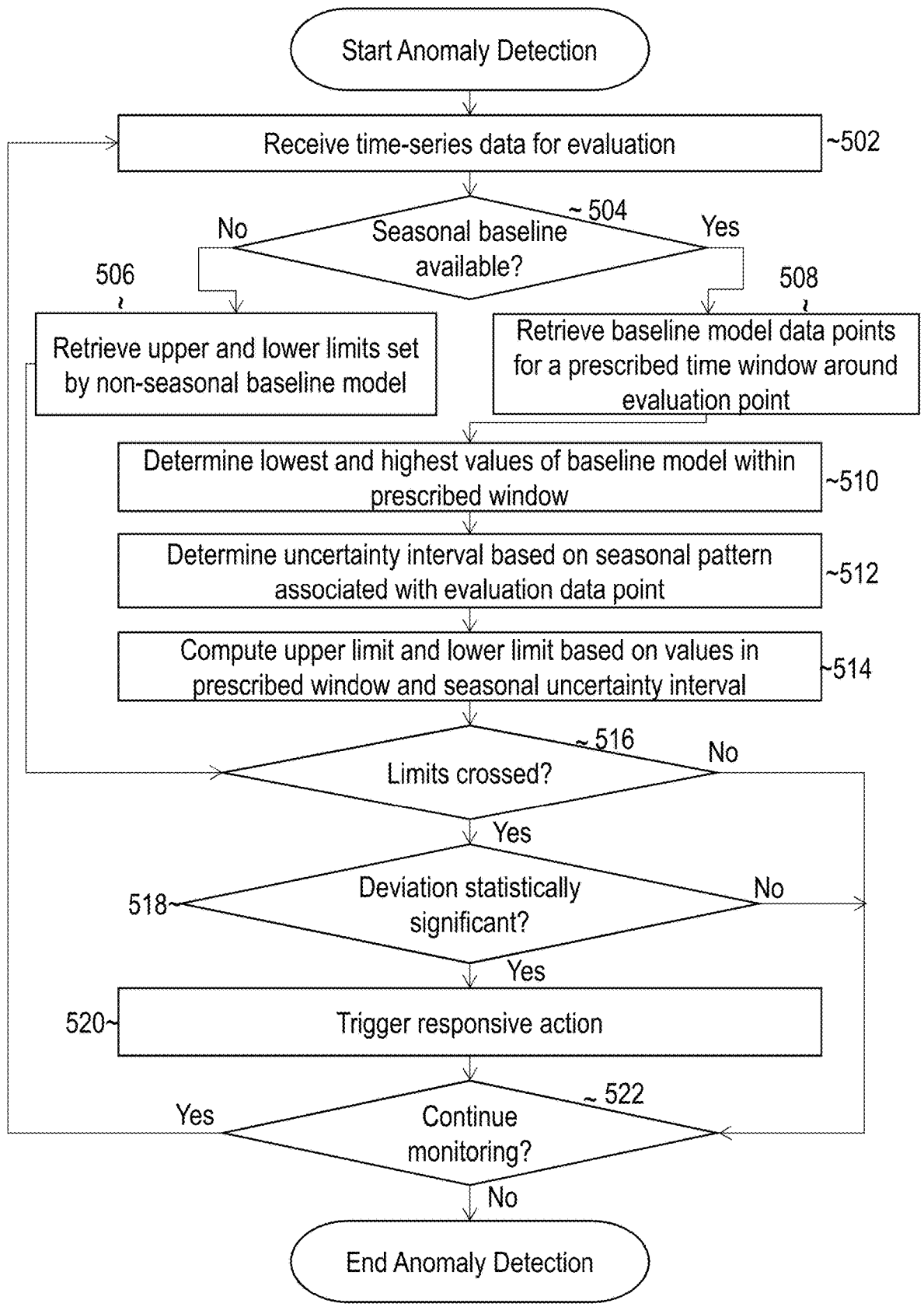
FIG. 5 illustrates an example set of operations for performing anomaly detection using trained baseline models in accordance with one or more embodiments.

FIG. 5 illustrates an example set of operations for performing anomaly detection using trained baseline models in accordance with one or more embodiments. The set of operations includes receiving time-series data for evaluation (Operation 502). The set of time-series data may be provided on-demand, periodically, or on a continuous/streaming basis. For example, baselining and anomaly detection services 130 may monitor one or more streams of resource metrics associated with targets 112*a-i*.

Responsive to receiving the time-series data, the process determines whether an associated seasonal baseline is available (Operation 504). For example, if the monitored time-series signal includes a CPU utilization rate for a particular target, the process may search data repository 140 for a trained baseline model. As previously described, in some cases, a seasonal baseline model may not be trained if no seasonal patterns were detected in the training set of data. In this case, a trained non-seasonal baseline model may be used for evaluation instead. If no baseline models are available, then the monitoring process may exit or wait until enough time-series data has been received to generate a baseline model.

If a seasonal model is not available, then the process continues by retrieving the upper and lower limits set by the associated non-seasonal baseline model (Operation 506). In the context of monitored CPU utilization rates, the model may define a lower limit (e.g., 30%) and upper limit (e.g., 60%) for a range of rates that conform to expected behavior defined by the non-seasonal model. In the context of database transactions, the model may define a conforming range of transaction per second based on the training set of database transactions. For other metrics, the baseline model may similarly define a range of values that conform to expected performance patterns.

If a seasonal model is available, then the process continues by retrieving baselines model data points for a prescribed time window around an evaluation data point (Operation 508). An evaluation data point in this context is a value in the time-series data set that is under examination. In one or more embodiments, the window may be defined as the hour the evaluation data point is in plus one collection to the left and right of the hour. For example, if the evaluation data point is a sample resource metric value captured at 9:20 a.m. on Monday, and the collection interval is every 10 minutes, then the window may be defined from 8:50 a.m. to 10:10 a.m. Other windows may be used and may vary from implementation to implementation. The prescribed time window acts as a smoothened expectation window that may compensate for drift measurement, as described further below.

The process next determines the lowest and highest values of the seasonal baseline model within the prescribed window (Operation 510). Continuing with the preceding example, for instance, the process may determine which value defined by the baseline is the maximum and which is the minimum from 8:50 a.m. to 10:10 a.m. These values may be determined using the Holt-Winters model or other seasonal baseline models described above and are retained to analyze the evaluation data point. The remaining baseline values within the window may be discarded from further consideration. By retaining the maximum and minimum values within the prescribed window, slight differences in measurement time do not affect the result of the evaluation.

The anomaly detection process further determines an uncertainty interval based on a seasonal pattern associated with the evaluation data point (Operation 512). For example, if the evaluation data point has a sample time corresponding to a high season (e.g., daily high, weekly high, etc.), then the uncertainty interval for the high season may be read from the corresponding baseline model. If the evaluation data point occurs in a different season (e.g., a daily low, weekly low, etc.), then a different uncertainty interval may be used. As previously indicated, the size of the uncertainty interval may vary from seasonal pattern to seasonal pattern based on variation and uncertainty amongst the data points.

Once the baseline values and uncertainty intervals have been determined, the process computes an upper limit and lower limit for the evaluation data point (Operation 514). The lower limit may be computed by subtracting the lowest value in the prescribed window by the uncertainty. The higher limit may be computed by summing the highest value in the prescribed window with the uncertainty. For example, if the lowest CPU utilization rate in a prescribed window is 40%, and the corresponding uncertainty interval for the season is ±10%, then the lower limit may be computed at 30%. If the highest value is 60%, then the upper limit may be computed as 70%. The limits may vary depending on the trained baseline model, seasonal patterns, and corresponding uncertainty intervals.

Once the limits have been extracted, the process compares the evaluation data point to determine whether the limits have been crossed (Operation 516). In the context of CPU utilization, for instance, the process may determine whether the evaluation data point is below the lower limit or above the upper limit. If the evaluation data point falls outside the conforming range of values that are between the two limits, then the process classifies the evaluation data point as anomalous. Conversely, if the evaluation data point is within the limits, then the evaluation data point is not classified as anomalous.

If the evaluation data point is classified as anomalous, the process determines whether the deviation is statistically significant (Operation 518). The determination of whether a deviation is statistically significant may vary from implementation to implementation. In some cases, a single anomalous data point may be classified as significant and trigger a responsive action. However, in other cases, an evaluation data point may be permitted to cross the limit without automatically triggering an alert. The process may account for the magnitude of the deviation of the evaluation data point, the number of data points in a sequence that have crossed the limits, and/or the cumulative magnitude of deviation fort the sequence of data points. One or more of these factors may compared to threshold values. If the thresholds are exceeded, then the deviation may be classified as statistically significant. If the deviation is not statistically significant, then monitoring may continue without triggering a responsive action.

In one or more embodiments, a cumulative sum (CUSUM) control chart is used to determine whether a deviation is statistically significant. A CUSUM control chart is a model that may be trained to model (a) the expected mean and standard deviation of a time-series signal; (b) the size of a shift from the historical mean and standard deviation; and (c) a control limit or threshold (e.g., five standard deviations) for classifying the time-series as statistically significant. The process may use the CUSUM control chart to track individual and cumulative sums of residual values (e.g., the sums of the negative and positive deviations from the mean). For example, the process may compare the residuals of the time-series signal being evaluated against the residuals of the historical time-series data used to train the baseline model. If a significant shift (e.g., the difference in residuals exceeds the control limit) is detected, then the process may determine that the evaluation data point is not an isolated incident but representative of a change in time-series behavior. In response, the process may classify the deviation as statistically significant.

If the deviation is determined to be statically significant, then the process triggers a responsive action (Operation 520). As previously indicated, a responsive action may include, but is not limited to generating an alert, deploying additional resources to satisfy unexpected increases in resource demand (e.g., to service additional client requests), bringing resources offline due to unexpected decreases in demand or to prevent potential compromising behavior (e.g., to prevent denial of service attacks), and updating resource configurations (e.g., shifting requests from a resource experiencing unexpected overload to a more available resource). The responsive action may be performed to mitigate performance degradation in the computing environment caused by the anomalous behavior.

The process further includes determining whether to continue monitoring the time-series data (Operation 522). Monitoring may be stopped at any point on demand, based on pre-defined time limits, or based on any other criteria. The process may stream or periodically receive time-series data generated by targets 112*a-i* for evaluation. The process may be repeated for remaining data points in the received time-series dataset and/or as new time-series date is received to continuing evaluating resource behavior within the computing environment.

During the anomaly detection process, different seasonal periods may be analyzed using different uncertainty models. For example, at time $t_1$, the process may be evaluating database transactions per second in a weekly high season. The trained baseline model may indicate that the expected number of database transactions per second at time t1 is 750 with an uncertainty of ±150 transactions per second. If the data point under examination at time $t_1$ falls outside the range of 600 to 900 transactions per second, then a responsive action may be triggered if the deviation is determined to be statistically significant. At a subsequent time $t_2$, a second data point being evaluated may occur at a weekly low season. The process may determine from the trained model that the expected number of transactions per second for that time of the week is 100 with an uncertainty of ±50 transactions per second. The range may be different than in the high season on account of less variation and uncertainty in the weekly low historical time-series data. In this case, a responsive action may be triggered if the data point under examination at time $t_2$ falls outside the range of 50 to 150 transactions per second. The numbers used above are given for purposes of illustration and may vary depending on the historical time-series dataset and training parameters used to generated the baseline model.

Figure 6A:
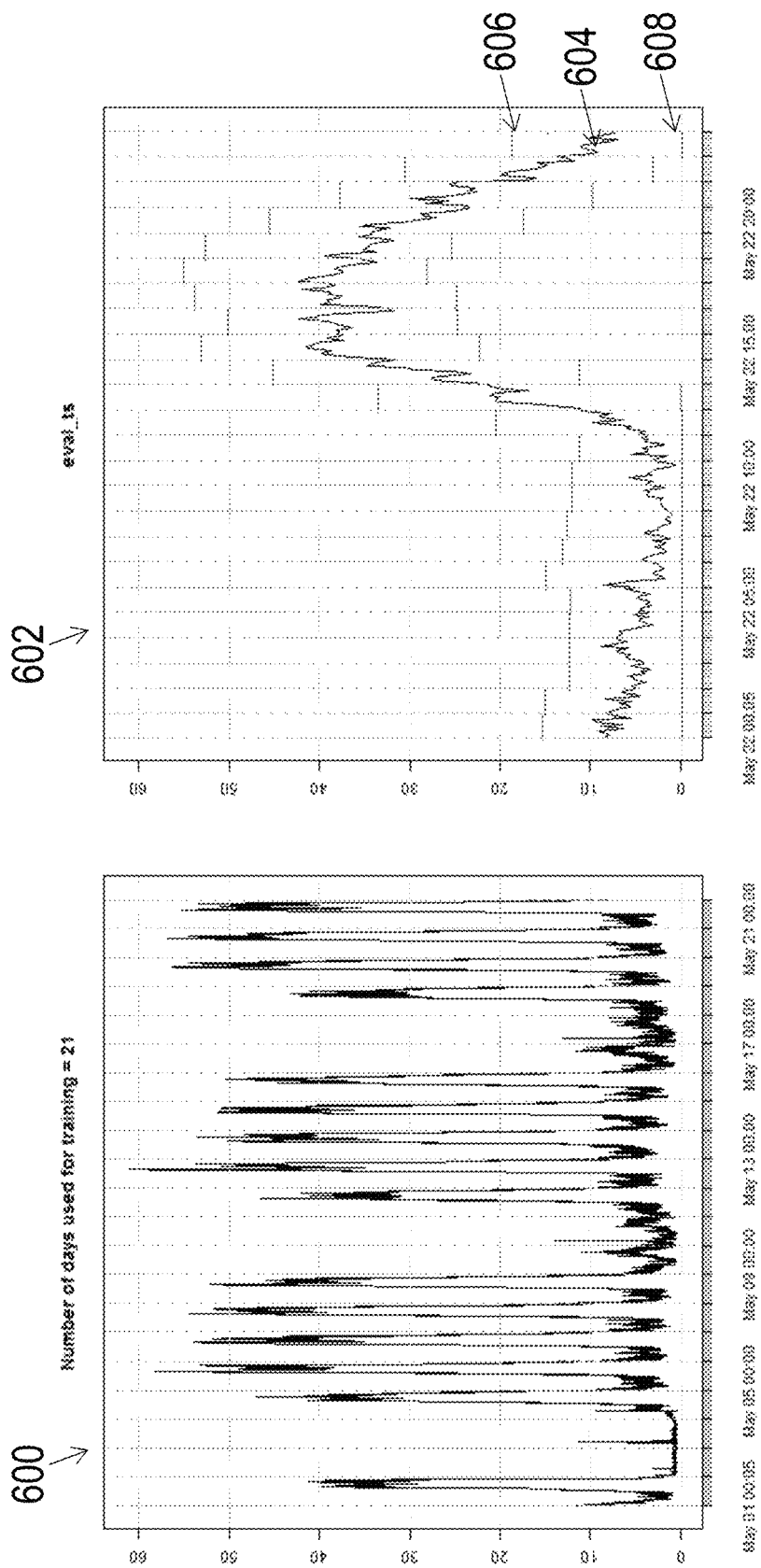
FIG. 6A illustrates an example evaluation of a time-series signal using a weekly baseline model in accordance with one or more embodiments.

FIG. 6A illustrates an example evaluation of a time-series signal using a weekly baseline model in accordance with one or more embodiments. Chart 600 illustrates a historical time-series dataset used to train the baseline model. The training time-series dataset includes twenty-one days of sample values. Chart 602 depicts time-series signal 604, which is monitored for anomalies using upper limit 606 and lower limit 608 of the trained baseline model. In the present example, the trained baseline tracks weekly seasonal patterns including weekly highs and lows. As can be seen, the width of the baseline varies between the weekly highs and lows. The width of the baseline is a function of the predictability observed from the historical time-series dataset used for training.

Figure 6B:
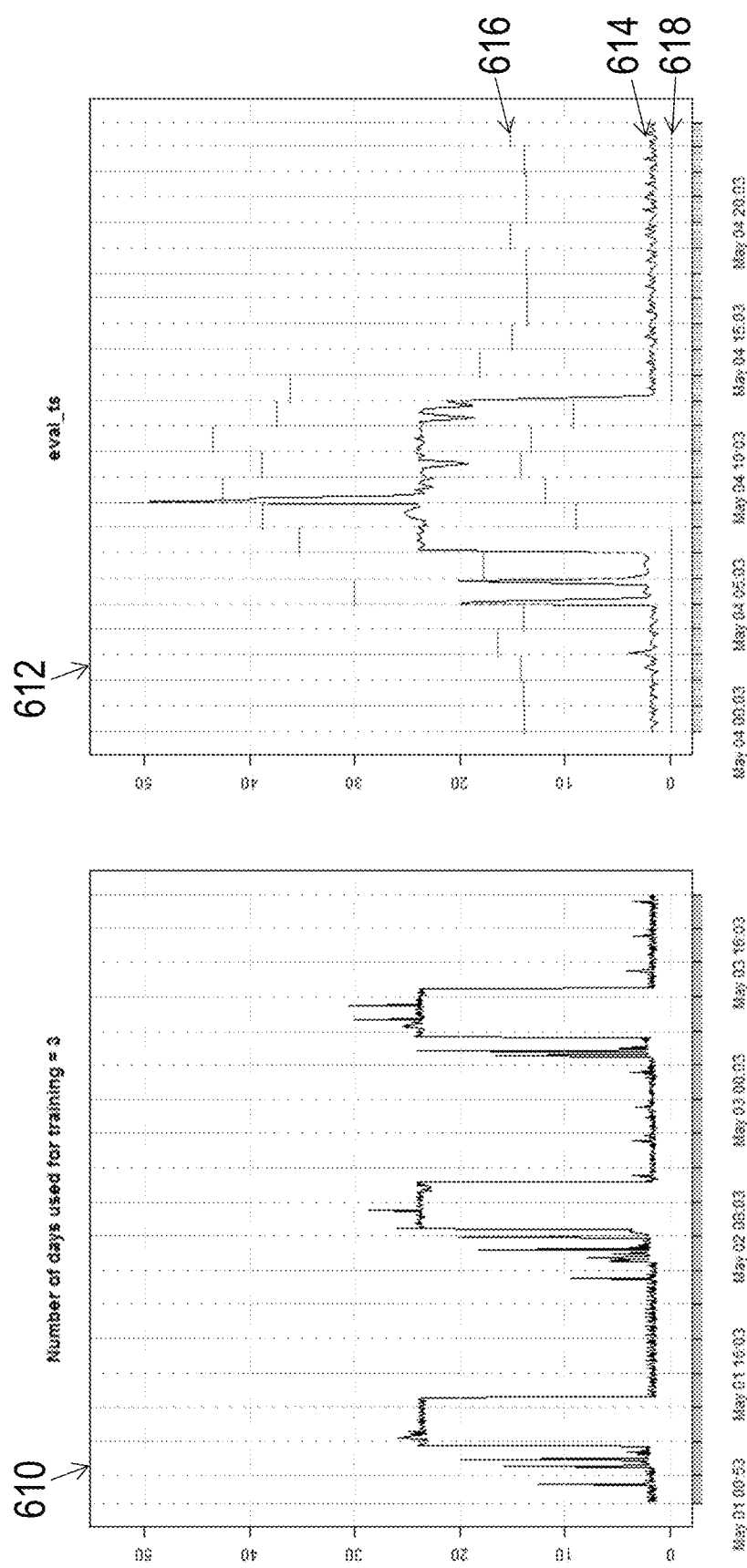
FIG. 6B illustrates an example evaluation of a time-series signal using a daily baseline model in accordance with one or more embodiments.

FIG. 6B illustrates an example evaluation of a time-series signal using a daily baseline model in accordance with one or more embodiments. Chart 610 illustrates a historical time-series dataset used to train the baseline model. The training time-series dataset includes three days of sample values. Chart 612 depicts time-series signal 614, which is monitored for anomalies using upper limit 616 and lower limit 618 of the trained baseline model. In the present example, the trained baseline tracks daily seasonal patterns including daily highs and lows.

Figure 6C:
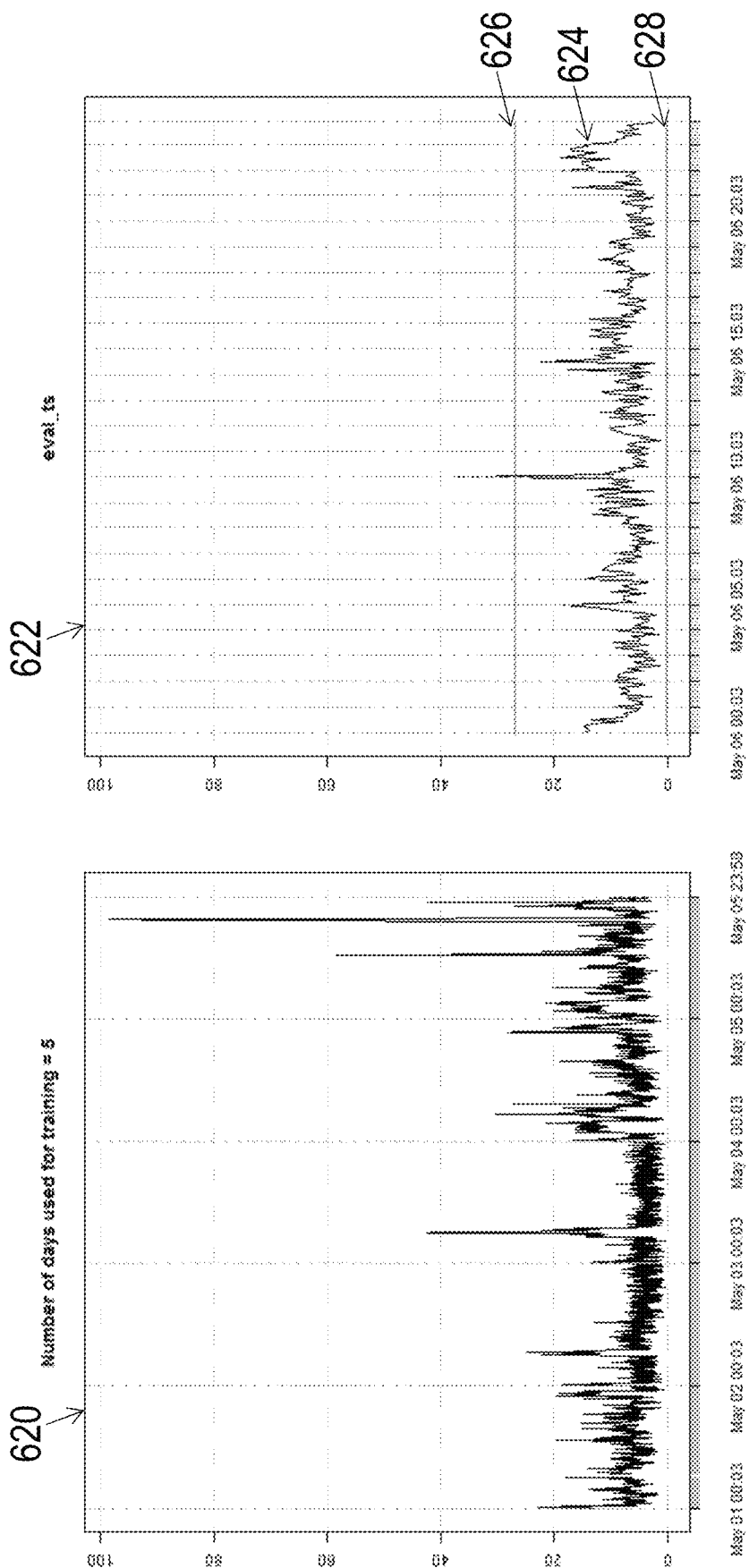
FIG. 6C illustrates an example evaluation of a time-series signal using a non-seasonal baseline model in accordance with one or more embodiments.

FIG. 6C illustrates an example evaluation of a time-series signal using a non-seasonal baseline model in accordance with one or more embodiments. Chart 620 illustrates a historical time-series dataset used to train the baseline model. The training time-series dataset of data includes five days of sample values. Chart 622 depicts time-series signal 624, which is monitored for anomalies using upper limit 626 and lower limit 628 of the trained baseline model. In the present example, no seasonal patterns were detected in the training time-series dataset. As a result, an MCI model is used to represent the baseline, and there is no variation in the uncertainty interval.

Figure 7:
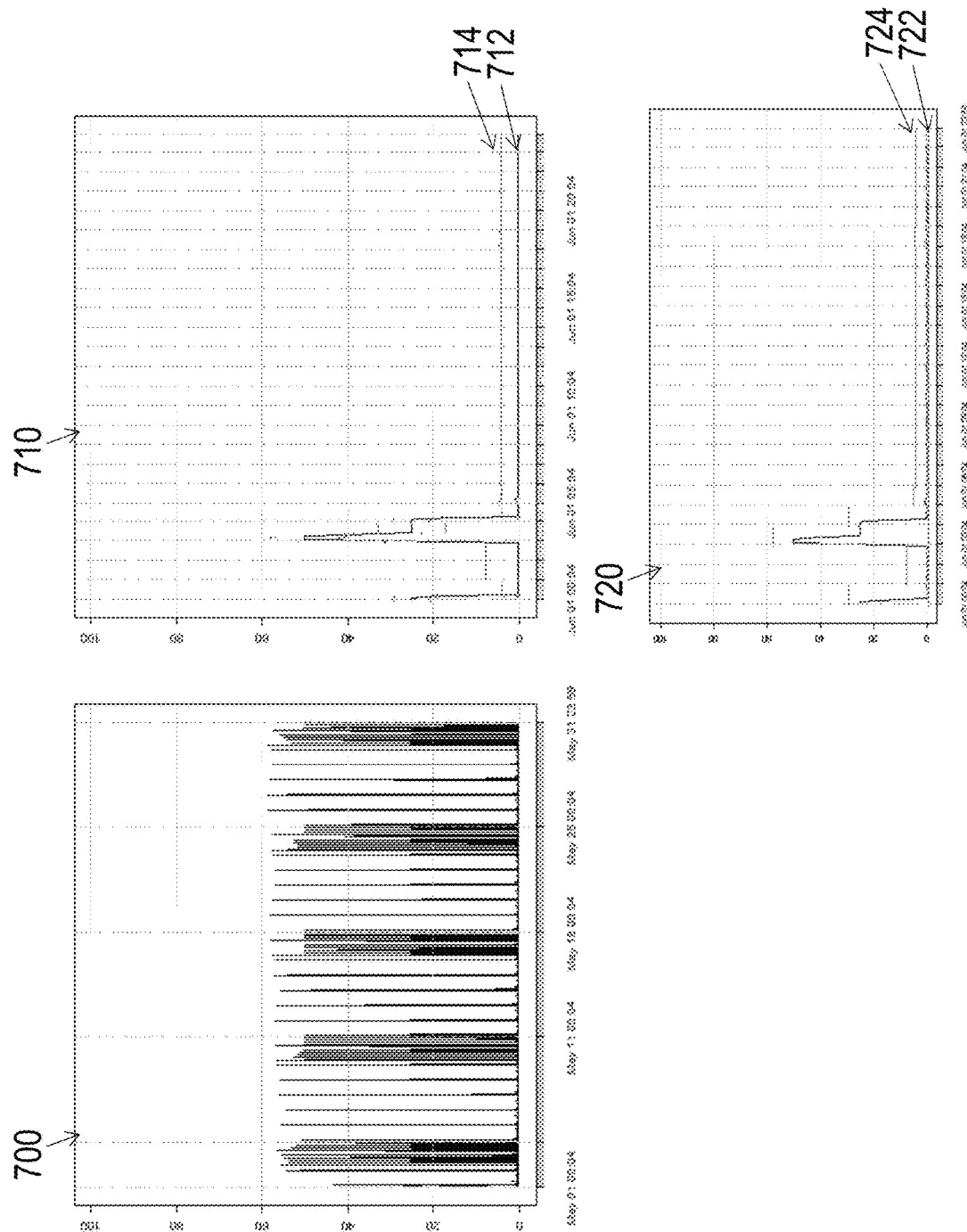
FIG. 7 illustrates an example difference between a baseline model before and after smoothing to account for drift in measurement in accordance with one or more embodiments.

As previously indicated, measurement drift may occur due to slight variations in sample times. To compensate for measurement drift, the time-series may be aligned using nearest-neighbor. Also, the baseline upper and lower limits may be computed over a prescribed window, as previously described. FIG. 7 illustrates an example difference between a baseline model before and after smoothing to account for drift in measurement in accordance with one or more embodiments. Chart 700 depicts thirty days of samples used to train the baseline model. Chart 710 depicts a baseline that is not smoothed over a prescribed window. As can be seen, the evaluation time series signal 712 briefly crosses the upper limit of baseline 714, which may be flagged as an anomaly. In this example, the anomaly occurs in a sparse high season and is due to measurement variability. Chart 720 depicts the result of smoothing the baseline over a prescribed window. Evaluation time-series signal 722 does not cross the upper limit of smoothed baseline 724. Thus, no false flag is generated in this instance.

Figure 8:
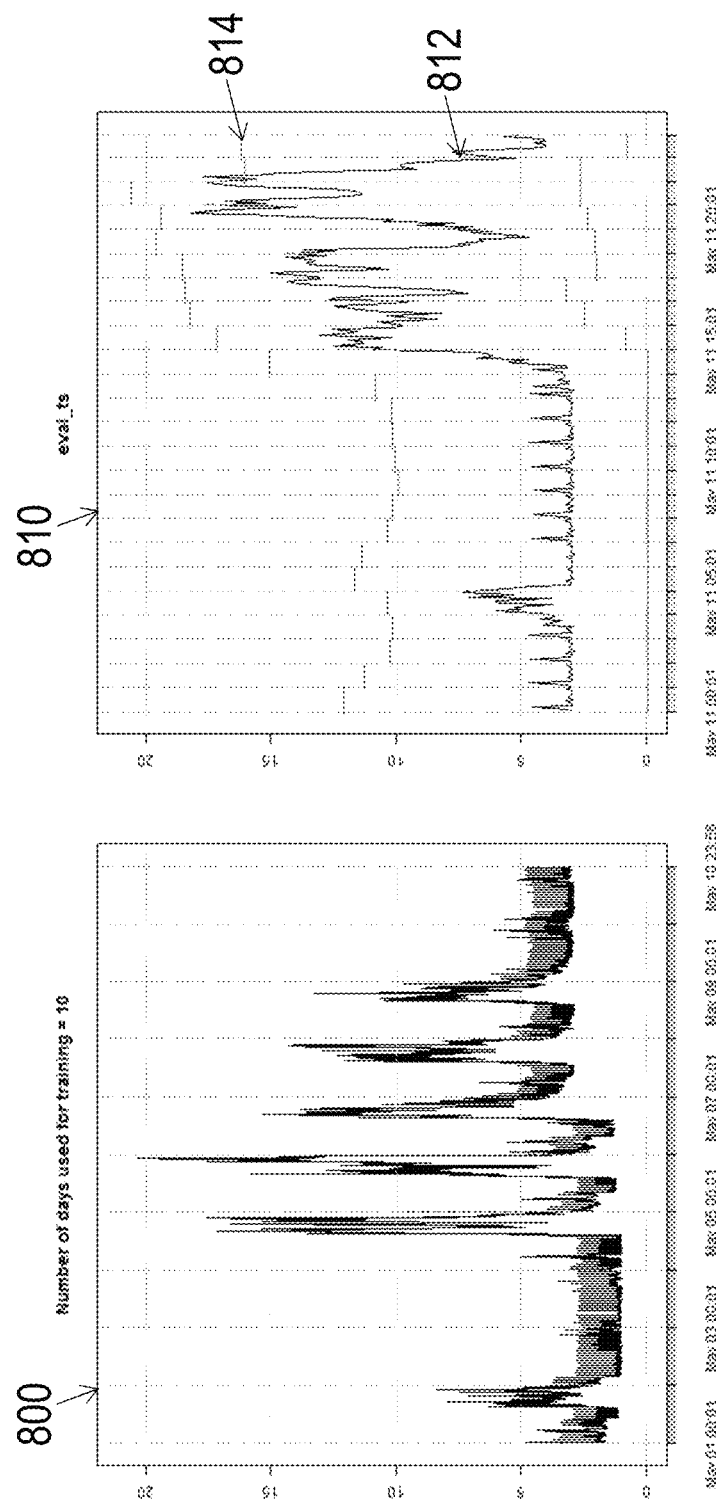
FIG. 8 illustrates an example deviation from a baseline model is classified as statistically insignificant in accordance with one or more embodiments.

FIG. 8 illustrates an example deviation from a baseline model that is classified as statistically insignificant in accordance with one or more embodiments. Chart 800 depicts a training time-series dataset, and chart 810 depicts an example evaluation of time-series signal 812 using a trained baseline. As can be seen, time-series signal 812 briefly crosses the upper limit 814. In the present example, the CUSUM of the deviation has not exceeded a threshold. Therefore, the deviation is not flagged as an anomaly in this instance. In other cases, even slight deviations may be flagged as deviations—the thresholds may be tuned based on system sensitivity.

In one or more embodiments, baseline and anomaly detection services 130 includes an interface, such as a GUI, CLI, and/or API, for presenting and responding to detected anomalies. For example, a GUI interface may present an interactive visualization to a user upon detecting an anomaly. The interactive visualization may include a graph of time-series data, such as those depicted in FIGS. 6A, 6B, AND 6C, that displays information about the detected anomalies. Example information may include, but is not limited, the time the anomaly was first detected, the magnitude and duration of the anomaly, and information (e.g. hostnames, IP addresses, resource type) about the target or set of targets which triggered the alert.

Additionally or alternatively, an interactive visualization may highlight a temporal region on a graph where the anomaly occurred. For example, if a time-series signal crosses an upper or lower limit of the baseline on Monday, from 2:00-4:00 p.m., this temporal region of the graph may be highlighted in red or another distinguishing color to allow the user to more easily identify the duration and magnitude of the deviation.

Additionally or alternatively, an interactive visualization may allow a user to click or otherwise select temporal regions of a graph to view more details about an anomaly. For example, responsive to an anomaly being detected, an initial chart may be displayed with a temporal region being highlighted where an anomaly was detected. Additional details about the anomaly may be stored in data repository 140 without being initially displayed. Responsive to clicking on the temporal region, the system may access the additional details from data repository 140 and display them to the end user. The additional details may give more specifics about the cause of the anomaly. For instance, if CPU utilization on a target host crosses an upper limit, additional details about the demands (e.g., the number of executions, transactions, user calls, etc.) on the target host may be presented.

Additionally or alternatively, an interactive visualization may visually depict shifts in different intervals. For example, the uncertainty interval for a high season may be displayed in one color, while the uncertainty interval for a low season may be displayed in a different color on the same graph. Additionally or alternatively, the transition point between the high and low season may be marked with a transition point, label, or other visual indicator.

Additionally or alternatively, an interactive visualization may allow a user to perform one or more responsive actions when an anomaly is detected. For example, a user may shut down a host, throttle requests, or perform any of the other responsive actions previously described. The interactive visualization may thus help users quickly identify and respond to problematic resource behavior within a cloud or other computing environment.

5. Baseline Updates and Transitions

In one or more embodiments, baselines are continuously or periodically updated as new time-series data is received from targets 112*a-i*. Responsive to receiving new time-series data, the training process may be re-executed to adjust a previously generated baseline model. For example, the new data points may be appended to the end of the previously used training set of data. The Additive or Multiplicative Holt Winters model may then be fit to the updated training dataset.

As more samples are received, baseline models may become more accurate over time. New seasonal patterns may be learned and/or previously modelled seasonal patterns may be refined. Uncertainty intervals may also begin to narrow as seasonal patterns become more defined.

Figure 9:
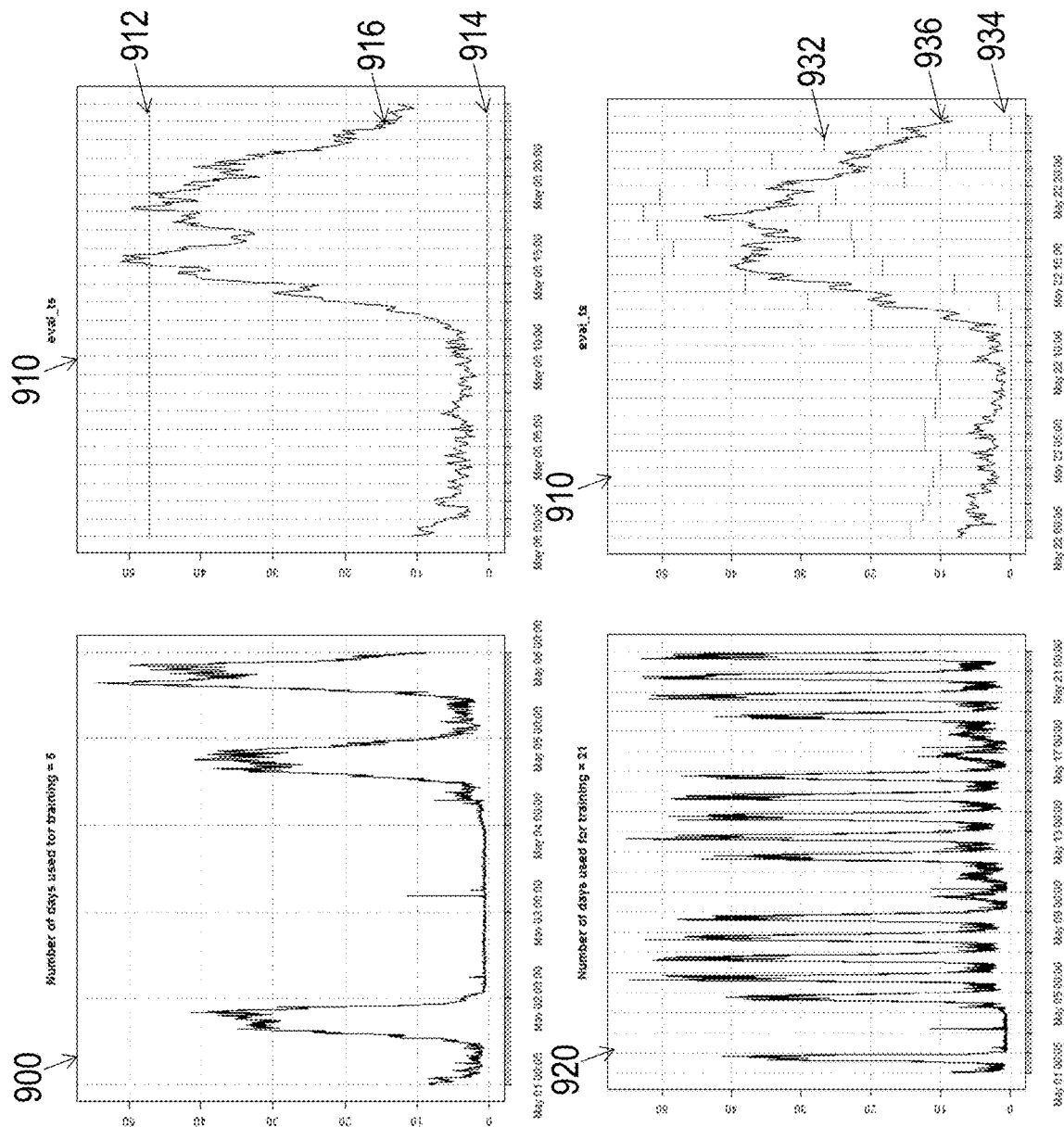
FIG. 9 illustrates an example evolution of a baseline model in accordance with one or more embodiments.

FIG. 9 illustrates an example evolution of a baseline model in accordance with one or more embodiments. Chart 900 depicts a training set with five days of sample values. Chart 910 depicts a trained baseline model having upper limit 912 and lower limit 914. Evaluation time-series data 916 briefly crosses upper limit 912 of the MCI baseline model. As more time-series data is received, seasonal patterns are extrapolated and modelled. Chart 920 depicts thirty-one days of sample values used to update the baseline model. Chart 930 depicts updated upper limit 932 and lower limit 934 of the baseline model. Evaluation time-series data 936 has a similar shape as evaluation time-series data 916, but does not cross the limits of the updated baseline model. Thus, the unsupervised training process has improved the baseline model over time as more samples are received.

In one or more embodiments, a baseline model may transition between modelling seasonal patterns recurring at different seasonal periods. For example, initially, a baseline model may be trained by fitting a non-seasonal model to the training dataset. As more data points are received, daily seasonal patterns may be extrapolated, and the baseline may be updated accordingly. As even more data points are received, the updated training dataset may be fit to a weekly seasonal model. Additionally or alternatively, the baseline may be updated to represent patters of other seasonal durations (e.g., bi-weekly, monthly, semi-annually, holidays, etc.)

Figure 10:
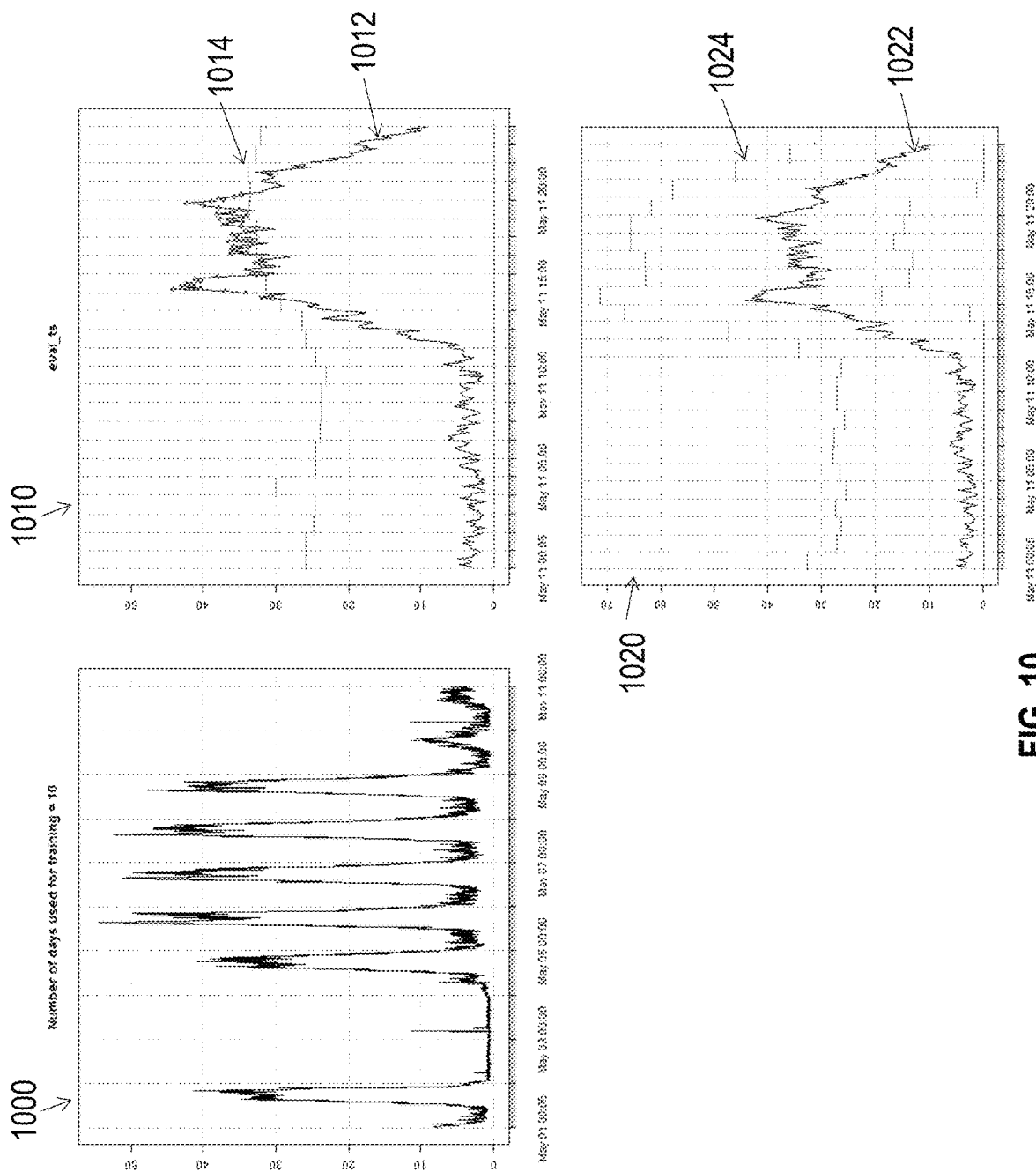
FIG. 10 illustrates an example difference in transitioning from one baseline model TO another using different approaches in accordance with one or more embodiments.

In one or more embodiments, training of a baseline model may be paused around potential transition points. Pausing training may help smooth the transition between different types of seasonality. For example, FIG. 10 illustrates an example difference in transitioning from one baseline model using different approaches in accordance with one or more embodiments. Chart 1000 illustrates a training series data with ten days of sample data. In the present example, the baseline model transitions from daily to weekly seasonality. Chart 1010 depicts an example baseline model that is generated without pausing training. As can be seen, evaluation dataset 1012 crosses upper limit 1014 of the baseline model. The reason for this breach is that weekdays and weekends are unbalanced. When the amount of training data is eight, nine, or ten days, the training data may potentially have two weekends worth of samples but only one sample for weekdays, which biases the model toward the low end of the spectrum in the present example. In order to prevent this imbalance, the training set of data may be truncated to seven days until at least eleven days of training data have been received, effectively pausing training of the baseline for three or more days. Chart 1020 depicts the result of truncating the training set of data to seven days. As can be seen, evaluation dataset 1022 does not cross the upper limit 1024 of the baseline model. Thus, by pausing training, the transition is more graceful, preventing false flags of anomalies resulting from unbalanced weekdays and weekends. The baseline intervals are larger in this case until more than ten days of data are received. After this point, the risk of imbalance is mitigated, and the baseline interval may begin to narrow/improve without triggering false alerts.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
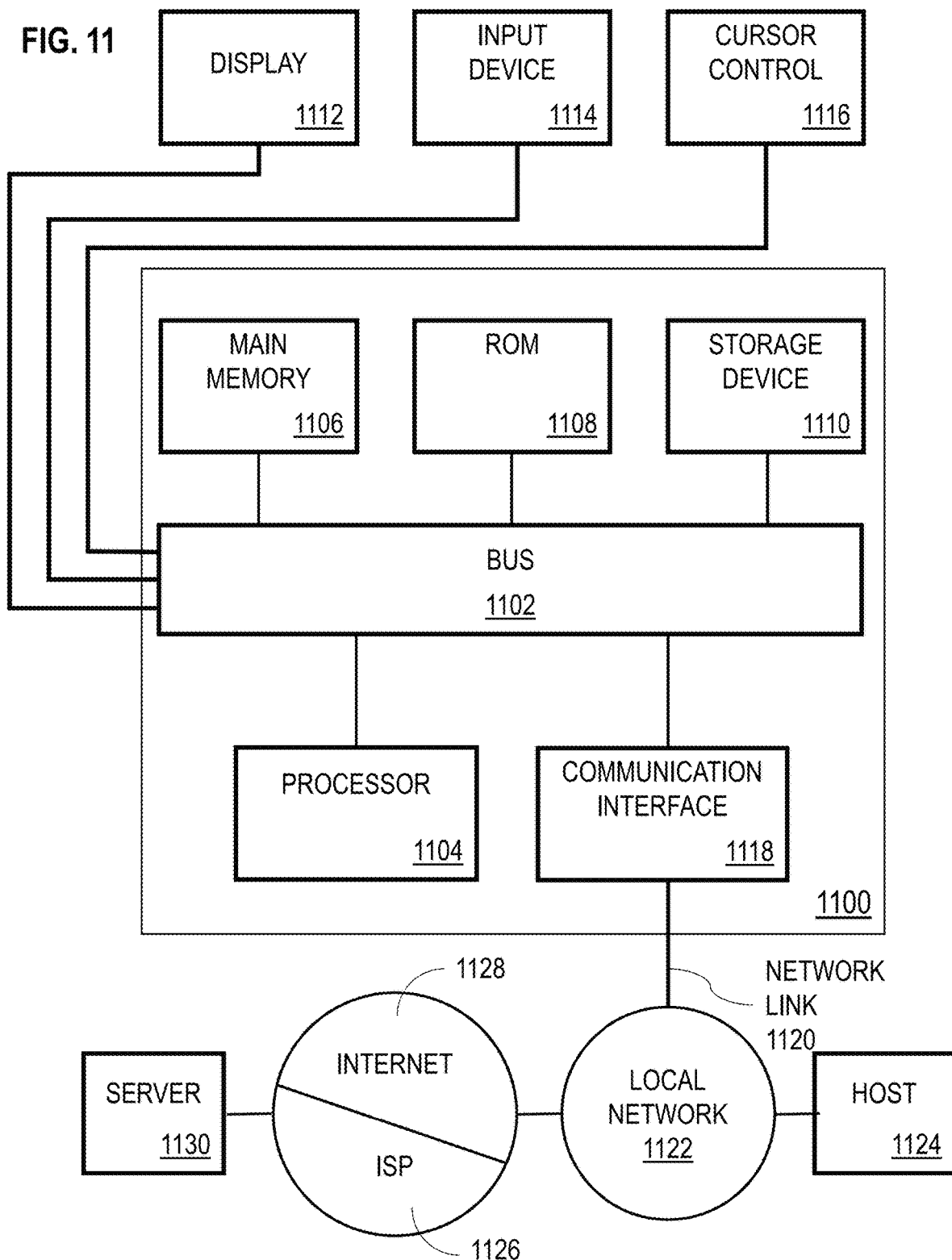
FIG. 11 illustrates an example computer system on which one or more embodiments may be implemented.

For example, FIG. 11 is a block diagram that illustrates computer system 1100 upon which one or more embodiments may be implemented. Computer system 1100 includes bus 1102 or other communication mechanism for communicating information, and hardware processor 1104 coupled with bus 1102 for processing information. Hardware processor 1104 may be, for example, a general purpose microprocessor.

Computer system 1100 also includes main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes read only memory (ROM) 1108 or other static storage device coupled to bus 1102 for storing static information and instructions for processor 1104. Storage device 1110, such as a magnetic disk or optical disk, is provided and coupled to bus 1102 for storing information and instructions.

Computer system 1100 may be coupled via bus 1102 to display 1112, such as a cathode ray tube (CRT), liquid crystal display (LCD), or light-emitting diode (LED), for displaying information to a computer user. Input device 1114, which may include physical and/or touchscreen based alphanumeric keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to host computer 1124 or to data equipment operated by Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims. Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a set of time-series data that includes a sequence of values captured by one or more computing devices over time;
    detecting two or more seasonal patterns within the set of time-series data, including a first seasonal pattern and a second seasonal pattern;
    generating, based on the set of time-series data, a first interval for the first seasonal pattern and a second interval for the second seasonal pattern;
    wherein the first interval represents a first distribution of sample values associated with the first seasonal pattern;
    wherein the second interval represents a second distribution of sample values associated with the second seasonal pattern;
    monitoring a first set of one or more data points occurring at a first time period within a time-series signal for anomalies in the first seasonal pattern based, at least in part, on whether the first set of one or more data points falls outside of the first interval;
    detecting, after the first time period, a transition between a first season when the first seasonal pattern is expected and a second season when the second seasonal pattern is expected;
    responsive to detecting the transition, transitioning monitoring of the time-series signal from using the first interval to using the second interval such that a second set of one or more data points occurring at a second time period within the time-series signal are monitored for anomalies in the second seasonal pattern based, at least in part, on whether the second set of one or more data points falls outside of the second interval; and
    in response to detecting an anomaly in the first seasonal pattern or the second seasonal pattern, generating an alert.

2. The method of claim 1, wherein the second interval represents a greater amount of uncertainty than the first interval.

3. The method of claim 1, wherein the first interval defines a first upper bound and a first lower bound within which a prescribed portion of data points associated with the first seasonal pattern fall; wherein the second interval defines a second upper bound and a second lower bound within which a prescribed portion of data points associated with the second interval fall.

4. The method of claim 1, further comprising detecting an anomaly in the first seasonal pattern responsive to determining that at least one data point in the first set of one or more data points falls outside the first interval.

5. The method of claim 1, further comprising, detecting a particular deviation of at least one data point in the first set of one or more data points from the first interval; responsive to detecting that the at least one data point in the first set of one or more data points falls outside the first interval, determining whether a cumulative sum of deviations, including the particular deviation, exceeds a threshold; and responsive to determining that the cumulative sum exceeds a threshold, detecting an anomaly in the first seasonal pattern.

6. The method of claim 1, further comprising updating the first interval and the second interval as more training data is received.

7. The method of claim 6, further comprising transitioning the first interval from representing the first seasonal pattern to representing a third seasonal pattern; wherein the third seasonal pattern recurs at a different seasonal period than the first seasonal pattern.

8. The method of claim 6, wherein updating the first interval and the second interval comprises updating a non-seasonal model to a seasonal model representing the first seasonal pattern and the second seasonal pattern.

9. The method of claim 1, wherein the first seasonal pattern is one of a sparse high, a dense high, a sparse low, or a dense low; wherein the second seasonal pattern is one of a sparse high, a dense high, a sparse low, or a dense low; wherein the first seasonal pattern is different than the second seasonal pattern.

10. The method of claim 1, further comprising pausing training of a baseline model used to monitor the time-series signal based, at least in part, on the amount of training data from the set of time-series data that is available to train the baseline model.

11. One or more non-transitory computer-readable media storing instructions, which, when executed by one or more hardware processors, cause performance of operations comprising:
receiving a set of time-series data that includes a sequence of values captured by one or more computing devices over time;
detecting two or more seasonal patterns within the set of time-series data, including a first seasonal pattern and a second seasonal pattern;
generating, based on the set of time-series data, a first interval for the first seasonal pattern and a second interval for the second seasonal pattern;
wherein the first interval represents a first distribution of sample values associated with the first seasonal pattern;
wherein the second interval represents a second distribution of sample values associated with the second seasonal pattern;
monitoring a first set of one or more data points occurring at a first time period within a time-series signal for anomalies in the first seasonal pattern based, at least in part, on whether the first set of one or more data points falls outside of the first interval;
detecting, after the first time period, a transition between a first season when the first seasonal pattern is expected and a second season when the second seasonal pattern is expected;
responsive to detecting the transition, transitioning monitoring of the time-series signal from using the first interval to using the second interval such that a second set of one or more data points occurring at a second time period within the time-series signal are monitored for anomalies in the second seasonal pattern based, at least in part, on whether the second set of one or more data points falls outside of the second interval; and
in response to detecting an anomaly in the first seasonal pattern or the second seasonal pattern, generating an alert.

12. The one or more non-transitory computer-readable media of claim 11, wherein the second interval represents a greater amount of uncertainty than the first interval.

13. The one or more non-transitory computer-readable media of claim 11, wherein the first interval defines a first upper bound and a first lower bound within which a prescribed portion of data points associated with the first seasonal pattern fall; wherein the second interval defines a second upper bound and a second lower bound within which a prescribed portion of data points associated with the second interval fall.

14. The one or more non-transitory computer-readable media of claim 11, the instructions further causing operations comprising detecting an anomaly in the first seasonal pattern responsive to determining that at least one data point in the first set of one or more data points falls outside the first interval.

15. The one or more non-transitory computer-readable media of claim 11, the instructions further causing operations comprising, detecting a particular deviation of at least one data point in the first set of one or more data points from the first interval; responsive to detecting that the at least one data point in the first set of one or more data points falls outside the first interval, determining whether a cumulative sum of deviations, including the particular deviation, exceeds a threshold; and responsive to determining that the cumulative sum exceeds a threshold, detecting an anomaly in the first seasonal pattern.

16. The one or more non-transitory computer-readable media of claim 11, the instructions further causing operations comprising updating the first interval and the second interval as more training data is received.

17. The one or more non-transitory computer-readable media of claim 16, the instructions further causing operations comprising transitioning the first interval from representing the first seasonal pattern to representing a third seasonal pattern; wherein the third seasonal pattern recurs at a different seasonal period than the first seasonal pattern.

18. The one or more non-transitory computer-readable media of claim 16, wherein updating the first interval and the second interval comprises updating a non-seasonal model to a seasonal model representing the first seasonal pattern and the second seasonal pattern.

19. The one or more non-transitory computer-readable media of claim 11, wherein the first seasonal pattern is one of a sparse high, a dense high, a sparse low, or a dense low;
wherein the second seasonal pattern is one of a sparse high, a dense high, a sparse low, or a dense low; wherein the first seasonal pattern is different than the second seasonal pattern.

20. The one or more non-transitory computer-readable media of claim 11, the instructions further causing operations comprising pausing training of a baseline model used to monitor the time-series signal based, at least in part, on the amount of training data from the set of time-series data that is available to train the baseline model.

* * * * *